United States Patent
Thompson et al.

(10) Patent No.: US 9,621,962 B2
(45) Date of Patent: Apr. 11, 2017

(54) METHODS AND SYSTEMS FOR RECORDING AND SHARING DIGITAL VIDEO

(71) Applicant: The DIRECTV Group, Inc., El Segundo, CA (US)

(72) Inventors: Jonathan A. Thompson, Torrance, CA (US); Michael E. Depies, Lawndale, CA (US); Stanley Y. Wang, Pittsburgh, PA (US)

(73) Assignee: THE DIRECTV GROUP, INC., El Segundo, CA (US)

( * ) Notice: Subject to any disclaimer, the term of this patent is extended or adjusted under 35 U.S.C. 154(b) by 0 days.

(21) Appl. No.: 14/590,893

(22) Filed: Jan. 6, 2015

(65) Prior Publication Data

US 2017/0013322 A1   Jan. 12, 2017

(51) Int. Cl.
| | |
|---|---|
| *H04N 7/173* | (2011.01) |
| *H04N 21/6587* | (2011.01) |
| *H04N 21/4147* | (2011.01) |
| *H04N 21/61* | (2011.01) |
| *H04N 21/2187* | (2011.01) |
| *H04N 21/439* | (2011.01) |
| *H04N 21/472* | (2011.01) |
| *G11B 27/031* | (2006.01) |

(52) U.S. Cl.
CPC ....... *H04N 21/6587* (2013.01); *G11B 27/031* (2013.01); *H04N 21/2187* (2013.01); *H04N 21/4147* (2013.01); *H04N 21/4392* (2013.01); *H04N 21/47205* (2013.01); *H04N 21/6143* (2013.01)

(58) Field of Classification Search
None
See application file for complete search history.

(56) References Cited

U.S. PATENT DOCUMENTS

| | | | |
|---|---|---|---|
| 8,745,500 B1* | 6/2014 | Kostello et al. | 715/723 |
| 2006/0245736 A1* | 11/2006 | Affaki | 386/109 |

(Continued)

OTHER PUBLICATIONS

Steele, Billy; "Clippit slices footage from live TV for sharing amongst your pals"; Nov. 24, 2014; 2 pages; http://www.engadget.com/2014/11/24/clippit-tv-app/; obtained Dec. 12, 2014.

*Primary Examiner* — Junior Mendoza
(74) *Attorney, Agent, or Firm* — Guntin & Gust, PLC; Joseph Hrutka (57) ABSTRACT

A method includes receiving and processing an electronic signal that represents television content to provide a first media signal that is playable to present a forward-playback of the television content. The method also includes, responsive to a first instruction, providing a second media signal that is playable to present a reverse-playback of the television content, and recording a portion of the television content that corresponds to the reverse-playback. Further, the method includes, responsive to a second instruction, stopping the recording of the television content. In addition, the method includes, responsive to a third instruction, saving one or more recorded portions of the television content. The method also includes, responsive to receiving a fourth instruction, communicating the saved recording of the television content to a separate computing device.

20 Claims, 9 Drawing Sheets

(56) References Cited

U.S. PATENT DOCUMENTS

| | | | |
|---|---|---|---|
| 2010/0310231 A1* | 12/2010 | Abe et al. ..................... | 386/241 |
| 2013/0013736 A1* | 1/2013 | Kennedy .................. | H04N 5/76 709/217 |
| 2013/0268620 A1* | 10/2013 | Osminer ....................... | 709/217 |
| 2014/0282001 A1* | 9/2014 | Lau ....................... | G06F 3/0488 715/723 |
| 2014/0373079 A1* | 12/2014 | Friedrich ......... | H04N 21/44008 725/88 |
| 2015/0067057 A1* | 3/2015 | Brekke et al. ............... | 709/204 |

* cited by examiner

METHODS AND SYSTEMS FOR RECORDING AND SHARING DIGITAL VIDEO

BACKGROUND

Unless otherwise indicated herein, the materials described in this section are not prior art to the claims in this application and are not admitted to be prior art by inclusion in this section.

Digital television (TV) broadcasting systems such as satellite TV, cable TV, and Internet TV (e.g., Internet Protocol TV (IPTV)) may be implemented exclusively from one another or complementary to one another in order to provide a wide variety of high-quality content. Such digital systems provide various advantages over conventional analog systems because the video and audio content are stored in digital format. For example, such digital systems may facilitate manipulation of video and/or audio content and support a wider range of recording options for video and/or audio content (e.g., optical, hard disc, Random-Access Memory (RAM), etc.).

Satellite TV systems, for instance, typically broadcast content to a number of users simultaneously in a system. Satellite TV systems also offer subscription or pay-per-view access to broadcast content. Access is provided using signals broadcast over the satellite, and the user can then access the particular content.

Many satellite TV systems include a set-top box that contains a TV-tuner input and functions to receive and decode the satellite signals, thereby changing the satellite signals into a form of content that can then be displayed on a TV screen or other display device. A set-top box typically includes memory, and may take the form of (or include) a digital video recorder (DVR) or other recording means. A DVR may encode and store received video content in compressed digital formats such as MPEG-4 for future retrieval by a user. In this manner, users are able to view high quality video content at any desired time without deterioration of image quality. Other digital TV broadcasting systems may employ the use of set-top boxes and related technology as well.

SUMMARY

In one aspect, a method is provided. The method may include receiving an electronic signal that represents television content by a computing device and processing the electronic signal to provide a first media signal that is playable to present a forward-playback of the television content. In this aspect, the method also includes receiving a first instruction to begin recording the television content and, responsive to receiving the first instruction, providing a second media signal that is playable to present a reverse-playback of the television content, and recording a portion of the television content that corresponds to the reverse-playback. Further, the method may include receiving a second instruction to stop recording the television content and, responsive to receiving the second instruction, stopping the recording of the television content. In addition, the method may include receiving a third instruction to save the recording of the television content and, responsive to receiving the third instruction, saving one or more recorded portions of the television content. In the present aspect, the method may also include receiving a fourth instruction to communicate the saved recording of the television content to a separate computing device and, responsive to receiving the fourth instruction, communicating the saved recording of the television content to the separate computing device.

In another aspect, another method is provided. This method may include receiving an electronic signal that represents television content by a computing device, processing the electronic signal to provide a first media signal that is playable to present a forward-playback of the television content, and storing the first media signal in a buffer storage of the computing device. Further, the method may include receiving a first instruction to begin recording the television content and, responsive to receiving the first instruction, the computing device providing a second media signal that is playable to present a reverse-playback of the television content, and setting an end point for a recording of a portion of the television content that corresponds to the reverse-playback. The method may also include receiving a second instruction to stop recording the television content and, responsive to receiving the second instruction, the computing device setting a start point for recording the portion of the television content that corresponds to the reverse-playback. In addition, the method may include receiving a third instruction to store the recording of the television content and, responsive to receiving the third instruction, the computing device storing the recording of the portion of the television content in a recorded content storage of the computing device. In one example, the stored recording is defined at least in part by the start and end points, and the stored recording is in a forward-playback order of the corresponding television content.

A further aspect is directed to a computing device that includes a processor, data storage, and program instructions stored in data storage and executable by the processor for carrying out a set of functions. The set of functions may include receiving an electronic signal that represents television content, processing the electronic signal to provide a first media signal that is playable to present a forward-playback of the television content, receiving a first instruction to begin recording the television content, and, responsive to receiving the first instruction, providing a second media signal that is playable to present a reverse-playback of the television content, and recording a portion of the television content that corresponds to the reverse-playback. Further, the set of functions may include receiving a second instruction to stop recording the television content and, responsive to receiving the second instruction, stopping the recording of the television content. In addition, the set of instructions may include receiving a third instruction to save the recording of the television content and, responsive to receiving the third instruction, storing a recording of one or more portions of the television content. In the present aspect, the set of instructions may also include receiving a fourth instruction to communicate the stored recording of the television content to a separate computing device and, responsive to receiving the fourth instruction, communicating the saved recording of the television content to the separate computing device.

In other embodiments, a non-transitory computer-readable medium has stored thereon instructions executable by a computing device to cause the computing device to perform operations. The operations may include the method processes and other program instructions disclosed herein.

Other aspects, embodiments, and implementations will become apparent to those of ordinary skill in the art by reading the following detailed description, with reference where appropriate to the accompanying drawings.

DETAILED DESCRIPTION

The following detailed description includes references to the accompanying figures. In the figures, similar symbols typically identify similar components, unless context dictates otherwise. The example embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein and illustrated in the figures can be arranged, substituted, combined, separated, and designed in a wide variety of different configurations, all of which are contemplated herein.

It should also be understood that while many example embodiments are primarily described herein with respect to satellite TV services, the disclosed methods and systems and associated operations could be implemented with respect to other digital TV broadcasting services, such as cable, Internet, and the like. Further, while the disclosed methods and associated operations are primarily described herein as performed by a computing device related to digital TV (e.g., a set-top box), the disclosed methods and associated operations could be performed by another type of computing device configured to manage digital content and provide such digital content to a user, such a mobile phone, tablet computer, laptop computer, and the like.

I. OVERVIEW

Embodiments are provided herein to facilitate recording of digital video. A user may record television content to a set-top box, such as a DVR, but can typically only record a desired program based on a predetermined start time and end time. Examples embodiments disclosed herein may provide a user with the ability to set the start and end times of a recording on demand. For example, as the user is watching a live television broadcast (or content) or a previously recorded broadcast (or content), the user can provide an instruction to begin recording a portion of the broadcast. Although current systems allow a user to provide an instruction to begin recording a portion of the broadcast, such systems only allow the user to provide an instruction to set a start time of the recording and then to program an end time or to provide a subsequent instruction to stop the recording.

In contrast, embodiments disclosed herein allow the user to provide an instruction to begin recording a portion of the broadcast by first setting an end time of the recording. As disclosed herein, in response to the instruction to begin recording the broadcast, a computing device may set the end time and begin a reverse-playback of the broadcast. As the broadcast is being played in reverse, the user may then provide another instruction to stop recording the portion of the broadcast, and the computing device may then responsively set a start time of the recorded portion of the broadcast. The computing device may then save the recorded portion of the broadcast based on the set start and end times. In one example, the computing device saves the recorded portion in a forward-playback order for subsequent playback.

In this manner, the user does not have to know the desired start time of the recording before beginning to record a television broadcast. By way of non-limiting example, the user may be viewing a live baseball broadcast and witness an exciting play (such as a home run, double-play, walk-off run, game winning strikeout, and the like). The user may then provide an instruction to begin "reverse-recording" the exciting play. Generally, as discussed above, the reverse-recording sets an end time for a recorded portion of the broadcast and starts a reverse-playback of the broadcast that allows the user to search for a desired start time for the recorded portion (such as when a pitch is thrown that is hit for a game winning home run). The user can then provide an instruction to set the desired start time as the broadcast is being played in reverse and, in response to this instruction, the computing device may set the start time and save a recorded portion of the broadcast defined by the set start and end times. In one example, as described generally above, the saved recorded portion may be saved in a forward-playback order for future playback.

This functionality of first setting an end point and then playing a broadcast in reverse to search for and set a desired start time may be facilitated by a buffer storage and television signal buffering process that is incorporated into various types of computing devices. A set-top box with digital video recording (DVR) functionality is one such computing device that receives a stream or sequence of modulated and encoded television signals. In response to a user selecting an available television channel, the set-top box may identify the particular television signals that correspond to the selected channel, and the set-top box may demodulate and decode (or otherwise process) the corresponding television signals to provide a media signal that is playable to provide video and/or audio content of the television signals. The buffering process includes storing the media signal in the buffer storage and providing the media signal for playback. For instance, some set-top boxes include a buffer storage that is capable of storing about 90 minutes of media signals that are currently being played back.

In accordance with the present disclosure, when the user provides a reverse-recording instruction, an end point can be set and the broadcast can be played back from the buffer storage. When the user provides the instruction to set the start point and save the recorded portion of the broadcast, the recorded portion from the buffer storage can be saved in a more permanent storage component (such as, a recorded content storage) of the set-top box.

This on-demand recording of portions of a television broadcast is also well suited to generate clips of television broadcasts that can be shared with others through email or other social networking applications. Accordingly, the present disclosure includes embodiments where a computing device may provide a user with options to share the recorded clips by email or directly to a social networking application. Numerous examples of email services and social networking applications are currently available and more will become available in the future. The present disclosure may be suitable for use with any email service and social networking application now known or later developed. Generally, social networking applications allow a user to open an account and share content (video, pictures, audio, text, and the like) with other account holders and/or particular groups of account holders.

The computing device may also provide a user interface for editing the recorded clips, such as to set different start and/or end times or frames. In one example, some social networking applications specify particular requirements for content to be shared. For instance, if the user has provided an instruction to share a clip on a particular social networking application that has a limit on the video length, the computing device may provide a notification that the clip must be edited to be no longer than the specified video length (e.g., six seconds). The user may then use the user interface to edit the clip to comply with the six second limitation before sharing the edited clip through the chosen application.

Further, the computing device may provide a user interface, which may be the same or a different user interface from editing recorded clip, to allow the user to provide a message to accompany the shared clip on a social networking application.

It should be understood that the above examples are provided for illustrative purposes, and should not be construed as limiting.

II. EXAMPLE COMMUNICATION SYSTEM AND ASSOCIATED DEVICES

Figure 1:
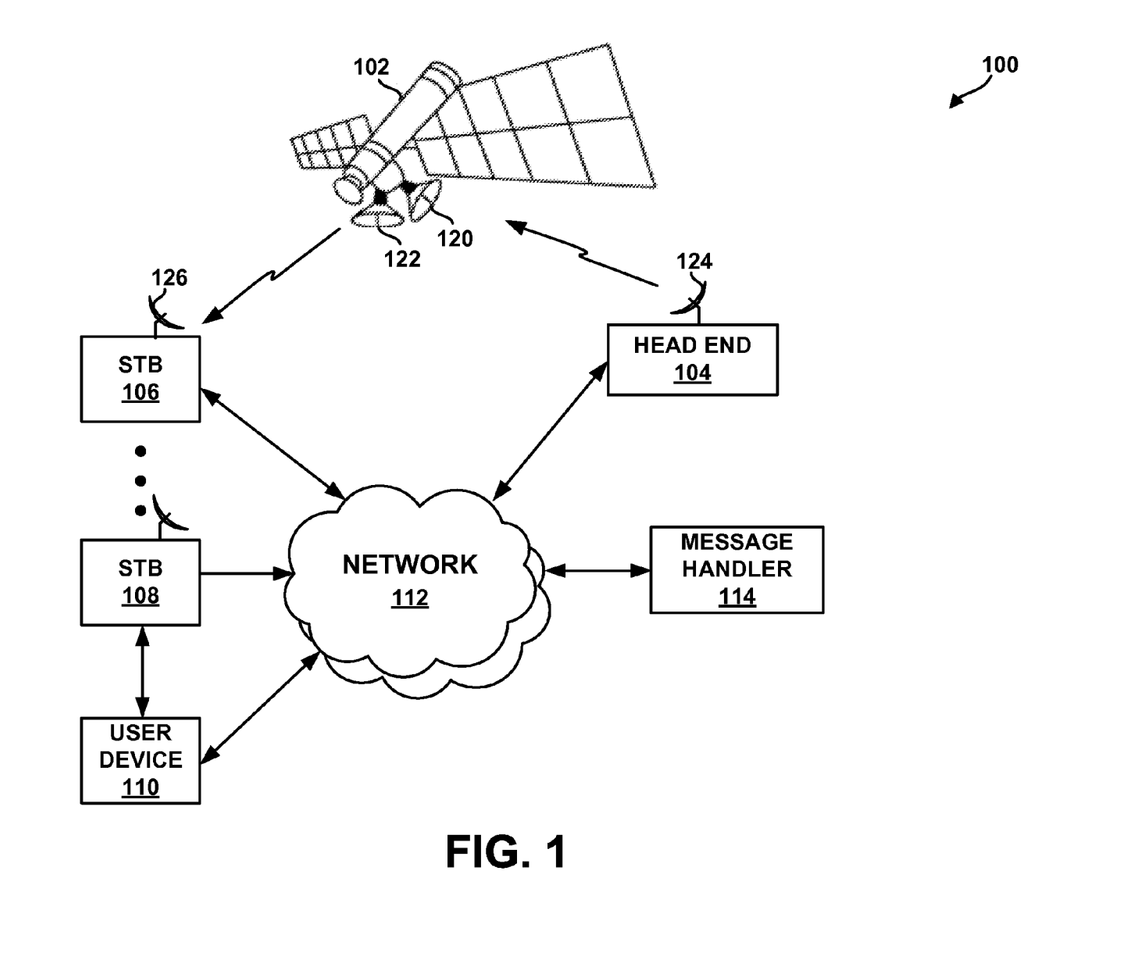
FIG. 1 is a simplified block diagram that illustrates a communication system, according to an example embodiment.

Referring now to the figures, FIG. 1 is a simplified block diagram that illustrates a communication system 100 in which embodiments of the disclosed methods and entities can be implemented. The communication system 100 may include a satellite 102, a head end 104, one or more set-top boxes 106, 108, one or more user devices 110, one or more networks 112, and one or more servers, such as a message handler server 114. Other devices may also be included in the communication system 100. It should be understood that, although not illustrated, multiple satellites, head ends, servers, and other components might be included in the communication system 100. Moreover, while multiple components are illustrated separately, it should be understood that one or more of the components may be implemented as distributed components.

Satellite 102 may include one or more antennas 124, 126 configured to send and receive digital or analog signals to one or more devices in the communication system 100. For instance, satellite 102 may include a first antenna 124 configured to receive data via an uplink signal from a device, such as head end 104. Satellite 102 may also include a second antenna 126 that may transmit data via a downlink signal to a receiving device. The receiving device may be a mobile device or a stationary device. Set-top boxes 106, 108 or user device 110 may be a mobile device or a stationary device. In some examples, a single antenna may be used to receive data via an uplink signal and transmit data via a downlink signal. Other examples are also possible.

Head end 104 may include a transmitting antenna 128 for communicating data using one or more signals. For instance, transmitting antenna 128 may send signals to the antenna 124 at satellite 102. Satellite 102 may in turn send downlink signals to a receiving device, such as set-top box 106. In another instance, head end 104 may communicate data to set-top box 106 via a network 112. Network 112 may be representative of one or more types of networks, such as a public switched telephone network, the Internet, a mobile telephone network, or other type of network.

Set-top boxes 106, 108 are examples of receiving devices configured to receive data from satellite 102 or network 112. For example, set-top box 106 may include or be connected to an antenna 130 for receiving downlink signals from antenna 126. Set-top box 106 may also include one or more components structured and arranged to receive signals from network 112. The type, content, and number of signals received by set-top box 106 may vary. For instance, the signals may be media signals that may include video or audio signals. Data sent via the media signals may include content, program data, images, requests, or the like. Accordingly, set-top boxes 106, 108 may each comprise a DVR or other device for recording and storing digital content or other such data. Other examples are also possible.

In some examples, set-top boxes 106, 108 may be interconnected with one or more devices in the communication system 100 via a local network (not illustrated). The local network, which may be a wired network or wireless network, may be used to interconnect set-top boxes 106, 108 within a household, multi-dwelling unit, or commercial building. The local network may also allow for multi-room viewing of content stored on a first set-top box (such as set-top box 106) and communicated to a second set-top box (such as set-top box 108) through the local network. The stored content can comprise content a set-top box 106 receives from antenna 126.

User device 110 may include a variety of stationary or mobile computing devices. For example, user device 110 may include a smartphone, personal computer, laptop computer, tablet computer, personal digital assistant (PDA), portable media player, or other computing device now known or later developed. User device 110 may be configured to send or receive data in a variety of ways. For example, user device 110 may receive downlink signals from antenna 126. In another example, user device 110 may send or receive signals from network 112. In yet another example, user device 110 may send or receive signals from one or more devices in the communication system 100. For instance, user device 110 may send or receive signals from set-top boxes 106, 108 via network 112. Other examples are also possible.

In some examples, user device 110 may be a mobile computing device such as a smartphone, tablet computer, or laptop computer that can be used to perform various operations in accordance with satellite TV services. For instance, user device 110 may support mobile applications that allow a user to remotely access and manage features and services that the user has subscribed to. By way of example, mobile applications may enable the user to remotely view TV programs on user device 110, and/or may enable the user to remotely schedule, add, delete, edit, or otherwise manage DVR recordings from user device 110. To facilitate such operations in practice, user device 110 may be linked communicatively, via a local network or other type of wired or wireless network, with one or more set-top boxes owned and maintained by a user, such as set-top box 108 as shown in FIG. 1. Other examples are possible as well.

Communication system 100 may also include one or more servers, such as message handler server 114. Message handler server 114 may include an enterprise service bus (ESB), and be configured to receive data from one or more devices via network 112. For example, message handler server 114 may receive signals from set-top box 106 via network 112. In some instances, the signals may include one or more requests to share content on social networking applications. However, other instances are also possible. After the message handler server 114 receives data, the message handler server 114 may process or communicate the received data to one or more other servers or components in the communication system 100.

Figure 2:
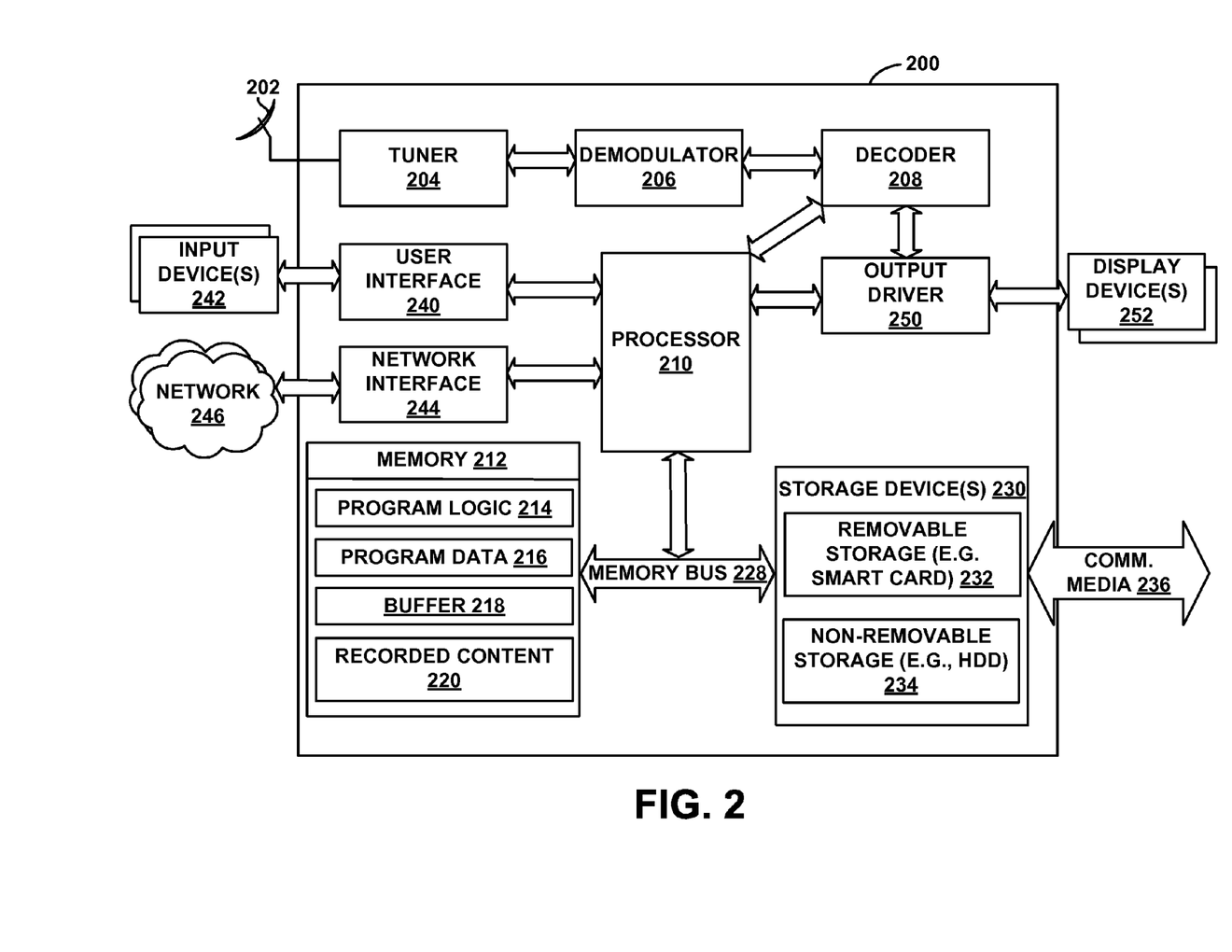
FIG. 2 is a functional block diagram that illustrates a computing device used in a communication system, according to an example embodiment.

FIG. 2 is a functional block diagram that illustrates a computing device 200 used in a communication system in accordance with embodiments described herein. Computing device 200 may take a variety of forms. For example, computing device 200 may comprise or be arranged as a set-top box (such as set-top boxes 106, 108 of FIG. 1), and may further comprise a DVR or other digital content recording device. The set-top box may be used for television or other media. As another example, computing device 200 may comprise or be arranged as a smartphone, personal computer, laptop computer, tablet computer, personal digital assistant (PDA), portable media player, or other computing device now known or later developed.

Computing device 200 may include an antenna 202, a tuner 204, a demodulator 206, a decoder 208, a processor 210, a memory 212, one or more storage devices 230, a user interface 240, a network interface 244, and an output driver 250. Although, a particular configuration of computing device 200 is illustrated, the configuration is merely representative of various possible devices for playing and recording television signals. For example, although only one tuner 204, one demodulator 206, and one decoder 208 are illustrated, multiple tuners, demodulators, or decoders may be provided within computing device 200. The components described in FIG. 2 may be communicatively linked by a system bus, network, or other connection mechanism.

Antenna 202 may be one of a number of different types of antennas that may include one or more low noise blocks downconverters associated therewith. For instance, antenna 202 may be a single antenna for receiving signals from a satellite (such as satellite 102 of FIG. 1), network (such as network 112 of FIG. 1), or terrestrial source. In another instance, antenna 202 may include multiple antennas for different orbital slots. In yet another instance, signals and other items described as being received by antenna 202 can be received by network interface 244 by way of a coaxial cable or other communication link. In that regard, one or more signals or items received at network interface 244 can be forwarded to tuner 204.

Tuner 204 may receive a signal from antenna 202. The signal may be a media or television signal that may include audio signals and/or video signals (or other visual media signals). The content of the signal may vary based on the type of signal. For example, the content may include television programming content, program guide data, or other types of data. Tuner 204 may then communicate the signal to demodulator 206. In one example, the received signal includes television signals for numerous different channels. In this example, tuner 204 is used to identify television signals corresponding to a selected channel, and to communicate the identified television signals to demodulator 206.

Demodulator 206 may receive the signal and demodulate the signal to form a demodulated signal. Decoder 208 may decode the demodulated signal to form a decoded signal or decoded data. The decoded signal may then be sent to processor 210 or output driver 250. Television signals are commonly compressed and encoded according to MPEG (Moving Picture Experts Group) specifications, such as the MPEG-4 specification. However, other examples are also possible.

Processor 210 may be any type of suitable processor, such as a microprocessor, a microcontroller, a digital signal processor (DSP), multicore processor, etc. Processor 210 may be used to coordinate or control tuner 204, demodulator 206, decoder 208, and any other components of computing device 200 that may or may not be illustrated in FIG. 2. In some implementations, processor 210 may include an internal memory controller (not illustrated). Yet other implementations may include a separate memory controller that can be used with processor 210.

A memory bus 228 can be used for communicating between the processor 210 and memory 212. Memory 212 may be any suitable type of memory. For example, memory 212 may include a non-transitory computer-readable medium, for example, such as computer-readable media that stores data for short periods of time like solid-state memory, flash drives, register memory, processor cache and RAM. The computer-readable medium may also or alternatively include non-transitory media, such as secondary or persistent long-term storage, like read only memory (ROM), optical or magnetic disks, compact disc read only memory (CD-ROM), for example. The computer-readable medium may also be any other volatile or non-volatile storage system. The computer-readable medium may, for example, be considered a computer-readable storage medium, a tangible storage device, or other article of manufacture.

Memory 212 may include program logic 214 and program data 216. Program logic 214 may include programming instructions, such as computer executable or logic-implemented instructions. In some examples, the programming instructions may be provided or otherwise obtainable in a downloadable format, such as via network 246 (such as network 112 in FIG. 1). Program data 216 may include program information that can be directed to various data types. For instance, program data 216 may include one or more applications that may execute one or more algorithms arranged to provide input components of computing device 200, in accordance with the present disclosure. Program data 216 may also include data (such as email addresses or user social media account information) that may be stored in memory 212 at computing device 200.

In FIG. 2, memory 212 also includes buffer storage 218 and recorded content storage 220. In one example, buffer storage 218 is used to temporarily store media signals corresponding to demodulated and decoded television signals, and the stored media signals are playable to present an audio/video playback of the television signals, such as on a television or computer display. For instance, processor 210 controls buffer storage 218 to temporarily and automatically store media signals corresponding to a selected television channel. In this example, processor 210 also controls buffer storage 218 to automatically overwrite stored media signals when the selected channel is changed, when computing device 200 is turned off, and/or when the buffer storage is full.

Further, in this example, recorded content storage 220 is used to store television signals and/or corresponding media signals that have been recorded for future playback. For instance, processor 210 controls recorded content storage to 220 store recorded television or media signals in response to a user-initiated instruction to record and store the content. In addition, processor 210 may control recorded content storage 200 to delete stored content in response to a user-initiated instruction to delete such content or in response to the storage being full or nearly full. In some examples, buffer storage 218 is a separate and distinct storage component from recorded content storage 220. Although, in other examples, buffer storage 218 and recorded content storage 220 may be located on the same storage component or device.

Generally, memory 212 may be distributed between one or more locations. For example, at least a portion of memory 212 may reside within processor 210. In another example, all or part of memory 212 may reside on a storage device 230. Storage device 230 may include removable storage devices, non-removable storage devices, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), memory cards, smart cards, tape drives, and the like. Computer storage media can include volatile and nonvolatile, transitory, non-transitory, removable and non-removable media implemented in any method or technology for storage of information, such as computer-readable instructions, data structures, program modules, or other data.

Computing device 200 may also include a user interface 240 that is configured to allow a customer to interact with computing device 200 via one or more input devices 242. Examples of input device 242 may include a remote control (or more simply, a remote), keyboard, a computer mouse, one or more push buttons, a touch screen, a smartphone, a tablet computer, a voice-activated interface, or the like. Input device 242 may be used, for example, to select a channel, select information, change the volume, change the display appearance, record content from one or more channels, or other functions using user interface 240. The process of making a selection with input device 242 may take a variety of forms, such as an action by a customer.

Computing device 200 may include network interface 244 for communicating data through one or more networks 246. Network interface 244 may take a variety of forms. For example, network interface 244 may be a WiFi, WiMax, WiMax mobile, data over cable service interface specification (DOCSIS), wireless, cellular, or other types of interfaces. Moreover, network interface 244 may use a variety of protocols for communicating via the network 246. For instance, network interface 244 may communicate using Ethernet, a Transmission Control Protocol/Internet Protocol (TCP/IP), a hypertext transfer protocol (HTTP), or some other protocol.

Computing device 200 may incorporate or be otherwise coupled to a display 252. Display 252 may be a television, monitor, or other device configured to display images. The images may be video, graphics, text, or any variety of other visual representations. In some examples, the display 252 may include an audio output, such as a loudspeaker, to generate sound waves from media signals received by display 252.

Display 252 may communicate with an output driver 250 within computing device 200 to facilitate communication between computing device 200 and display 252. In some implementations, output driver 250 may work in conjunction with a graphics processing unit (not illustrated), which can be configured to communicate with display device 252. Output driver 250 can communicate with display device 252 by a high-definition multiple interface (HDMI) cable, a coaxial cable, some other wired communication link, or wirelessly.

In some examples, computing device 200 may communicate directly or indirectly with one or more additional devices using a communication media 236. A communication connection is one example of a communication media 236. Communication media 236 may be embodied by computer-readable instructions, data structures, program modules, or other data in a modulated data signal, such as a carrier wave or other transport mechanism. The communication media 236 may also include wireless, optical, or other information delivery media. A modulated data signal can be a signal that has one or more of its characteristics set or changed in such a manner to encode information in the signal. By way of example, and not limitation, communication media 236 can include wired media such as a wired network or direct-wired connection, and wireless media such as acoustic, radio frequency (RF), infrared (IR) or other wireless media. The communication may include a cellular or cellular data connection, a satellite data connection, etc.

Figure 3:
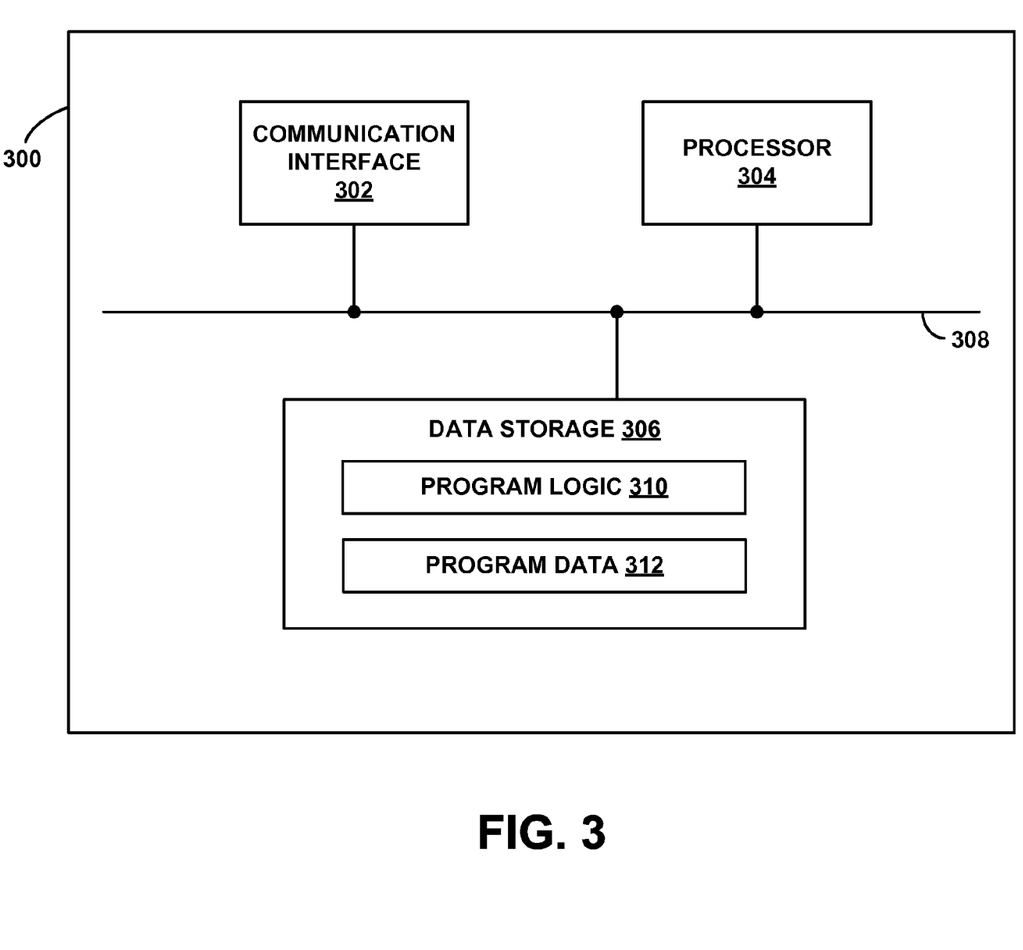
FIG. 3 is a functional block diagram that illustrates a server used in a communication system, according to an example embodiment.

FIG. 3 is a functional block diagram that illustrates a server 300 used in a communication system in accordance with embodiments described herein. As shown, server 300 may include a communication interface 302, a processor 304, and a data storage 306, all of which may be communicatively linked together by a system bus, network, or one or more other connection mechanisms 308. Although not shown, server 300 may also include other components, such as external storage. It should also be understood that the configuration or functionality of server 300 may be distributed or subdivided between a plurality of entities, such as multiple servers. Further, it should be understood that some of the functions described herein may be carried out by an entity other than a server.

In server 300, the communication interface 302 may comprise one or more structures, and associated equipment, for receiving data from one or more sources and distributing data to a group of one or more destinations. For instance, communication interface 302 may be configured to receive an instruction from one or more entities (such as a set-top box) to share recorded content on a social media account associated with a user or customer. The communication interface 302 may also be configured to provide for a communication to occur once the instruction is processed.

Processor 304 may comprise one or more processors, such as general-purpose processors (e.g., a microprocessor), special-purpose processors (e.g., an application-specific integrated circuit (ASIC) or digital-signal processor (DSP)), programmable-logic devices (e.g., a field programmable gate array (FPGA)), or any other processor components now known or later developed. Processor 304 may be integrated in whole or in part with other components of server 300.

Data storage 306 may be a non-transitory computer-readable medium. For example, data storage 306 may take the form of one or more volatile or non-volatile storage components, such as magnetic, optical, or organic storage components, integrated in whole or in part with a processor 306. As further shown, data storage 306 may include program logic 310 or program data 312. Program logic 310 may include, for example, machine language instructions executable by processor 304 to carry out various functions, such as the functionality of the methods and systems described herein. Program data 312 may include one or more types of data deemed suitable for a given implementation. For example, program data 312 may include program information that can be directed to various social network accounts. Program data 312 may also include data (such as recorded media content and/or text messages) that may be stored in memory.

In some embodiments, server 300 may be configured to manage multiple set-top boxes or other computing devices associated with a particular network. For instance, a user may have multiple set-top boxes in the user's home, and server 300 may relay messages from one set-top box to another, and/or may relay messages transmitted from a computing device such as a smartphone to one or more set-top boxes in the user's local network. As such, server 300 may propagate changes the user has made to settings of (and/or recordings made to) of one set-top box to one or more other set-top boxes in the local network. Server 300 may be configured to perform other operations as well.

III. ILLUSTRATIVE FUNCTIONALITY

Figure 4:
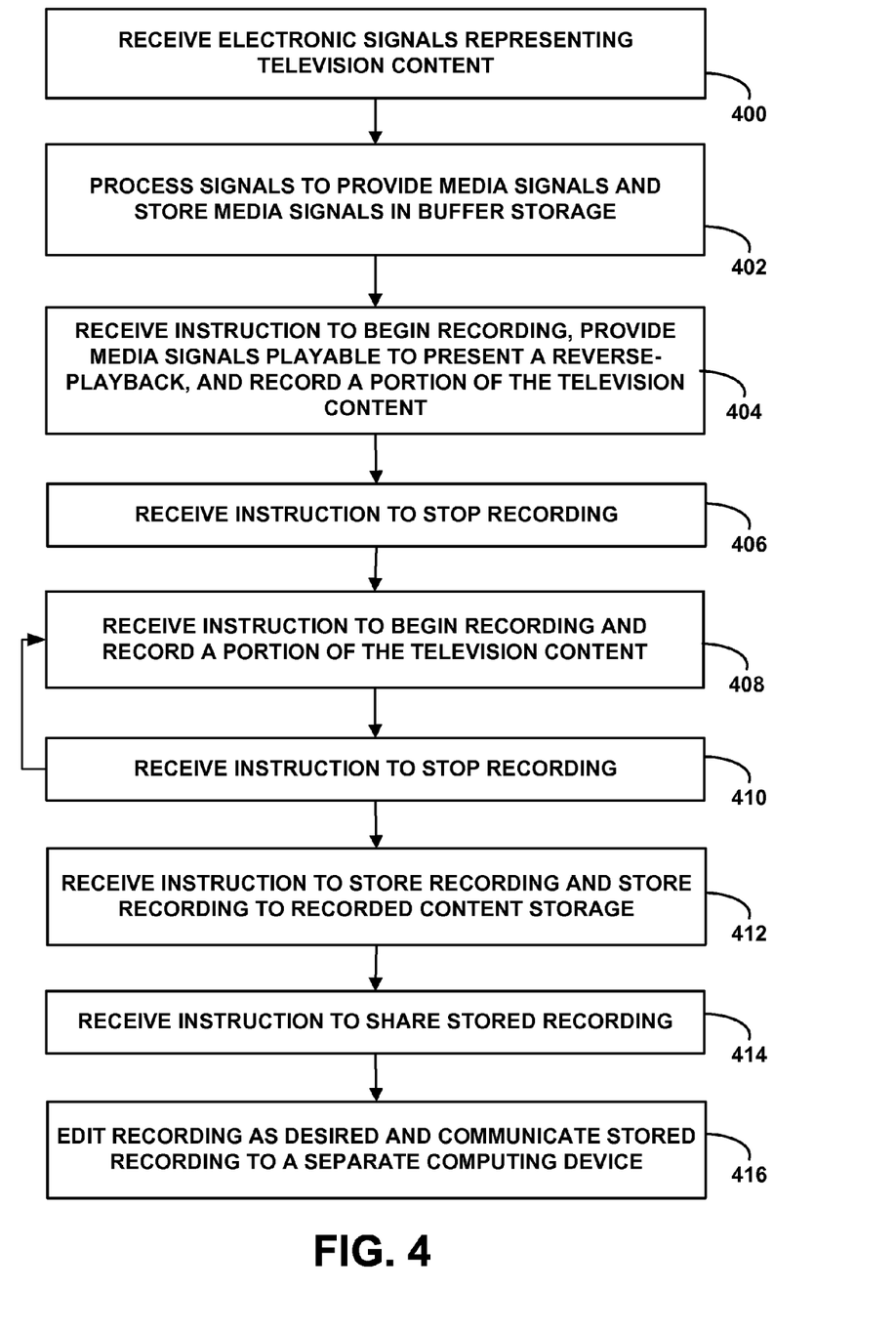
FIG. 4 is a flow chart depicting operations that can be carried out in accordance with the methods described herein.

FIG. 4 is a flow chart of an example method that may be included in or performed by the communication system to facilitate implementation of the methods described herein. For purposes of illustration, the method in FIG. 4 is described as being implemented by a computing device (such as set-top box 106 in FIG. 1, computing device 200 in FIG. 2, or server 300 in FIG. 3) comprising a DVR. However, the method could be implemented by and/or used with other devices (e.g., smartphones or other computing devices by which a user can manage the DVR) or may be performed by a combination of any components of such devices. In addition, the method could be carried out in accordance with the systems and aspects illustrated in FIG. 4. The method may include one or more operations, or actions as illustrated by one or more of blocks 400-416. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method and other processes and methods disclosed herein, the flowchart shows operation of one possible implementation of present implementations. In this regard, each block may represent a module, a segment, or a portion of program code, which includes one or more instructions executable by one or more processors for implementing specific logical operations or steps in the process. The program code may be stored on any type of memory described above, such as a non-transitory computer readable medium that includes non-transitory media, for instance.

Furthermore, for the method and other processes and methods disclosed herein, each block in FIG. 4 may represent circuitry that is wired to perform the specific logical operations in the process.

At block 400, the set-top box receives television signals, and at block 402, the set-top box processes the received television signals to provide media signals that are playable to provide the audio/video content of the television signals. More particularly, in one example, at block 402, the set-top box receives a selection of a particular channel, and the set-top box identifies the television signals that correspond to the selected channel. The set-top box then processes the identified television signals to provide corresponding media signals. At block 402, the set-top box may also store the media signals in buffer storage.

At block 404, the set-top box receives an instruction to begin recording. The instruction may be received through a remote control operated by a user, for instance. To distinguish from a "normal" recording instruction (i.e., an instruction to start recording and continue recording as the media signals play forward), in one example, the remote control may include a separate button for "reverse-recording," as disclosed herein.

Figure 5:
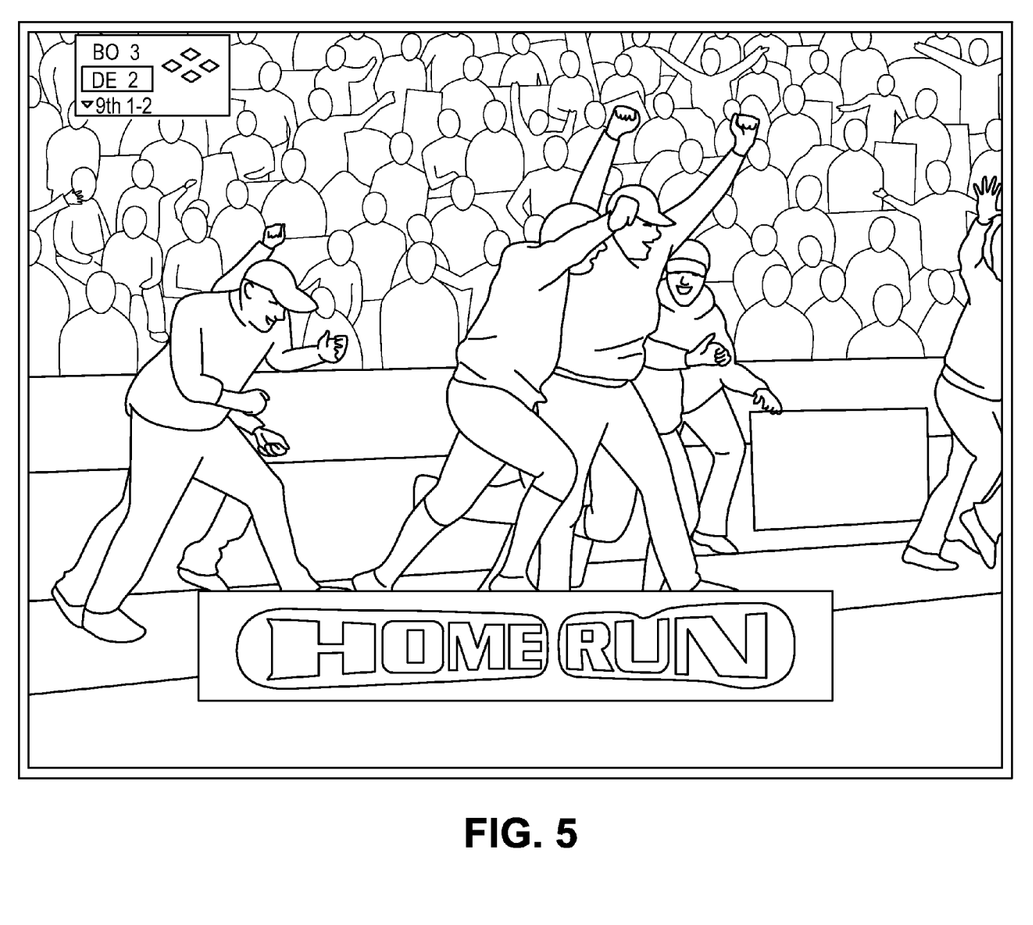
FIGS. 5-9 generally illustrate example screen shots and user interfaces in accordance with embodiments described herein.
Figure 6:
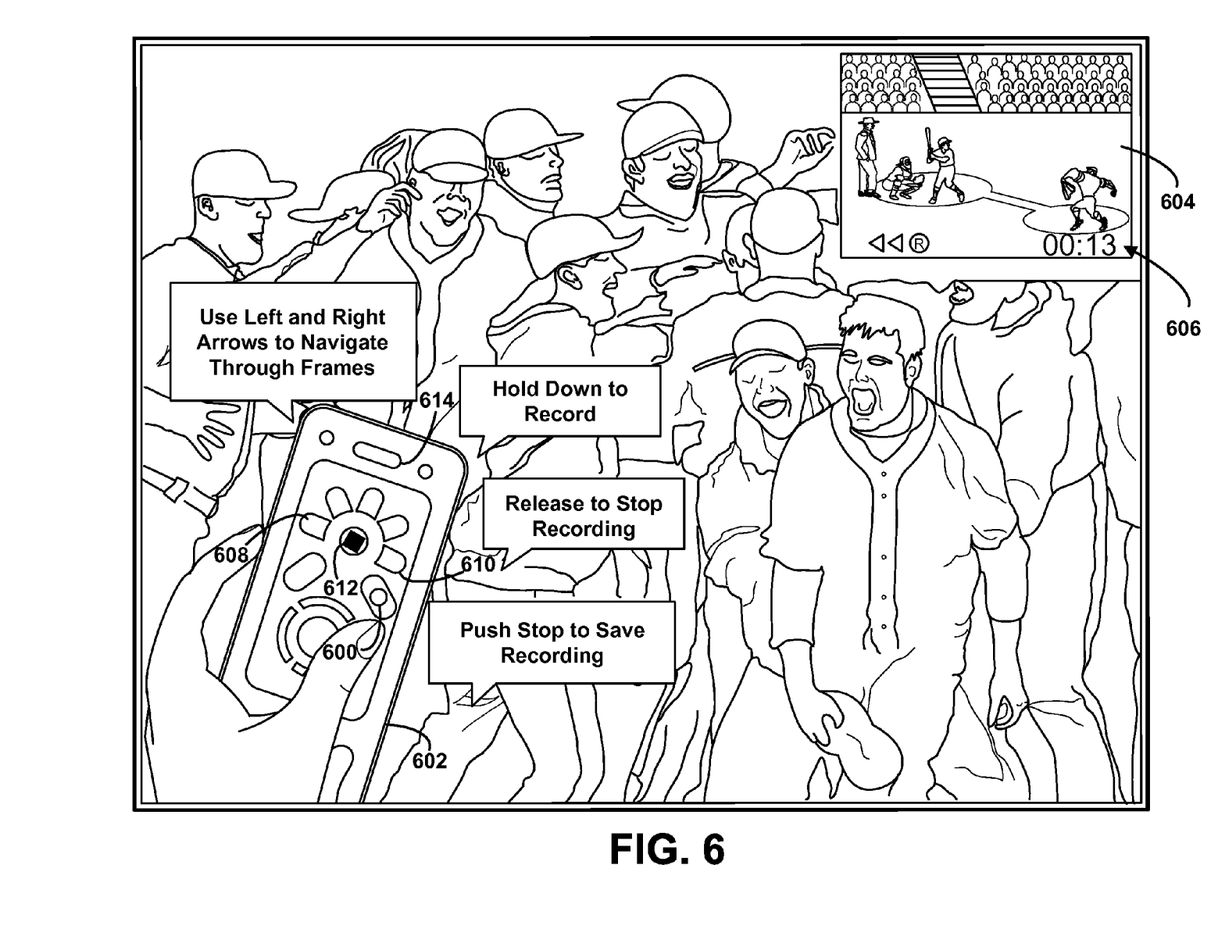

Referring to FIGS. 5 and 6, for example, the user may be watching a live baseball game and may witness an exciting play, such as a home run, as seen in FIG. 5. In this example, the user may then press a reverse-record button 600 on a remote control 602, as illustrated in FIG. 6. With reference to block 404 and FIG. 6, pressing the reverse-record button causes the set-top box to provide another sequence of media signals that are playable to present a reverse-playback of the selected channel. In the present example, concurrently with providing the reverse-playback media signals, the set-top box sets an end time or otherwise starts to record the media signals that are being played in reverse. As shown in FIG. 6, the reverse-playback can be configured to be displayed in a picture-in-picture box 604 over the media signals that may continue to be played forward. Thus, the forward-playback and the reverse-playback may be provided simultaneously on the same display. Further, in the example of FIG. 6, a timer 606 is provided to display how much content has been recorded.

At block 406, the set-top box receives an instruction to stop recording. For example, the user may release the reverse-record button 600 on the remote 602 in FIG. 6 to provide the stop instruction to the set-top box. Accordingly, in this example, the user holds down the reverse-record button 600 to initiate the reverse-recording, continues to hold down the reverse-record button to record portions of a television broadcast that was just viewed (and which would be stored in the buffer storage), and releases the reverse-record button to stop the recording.

In response to receiving the instruction to stop recording, the set-top box may set a start time or otherwise stop recording the media signals that are being played in reverse. Thereafter, at blocks 408 and 410, the set-top box may prompt the user to continue playing the media signals in reverse, and the set-top box may receive further instructions to begin and stop recording another portion of the media signals. The user may also use left and right buttons 608, 610, respectively, on the remote 602 to move to different frames of the media signal, and may begin and stop recording at desired frames of the media signal using the reverse-record button 600.

At block 412, the set-top box may receive an instruction to store the recorded media signals. Referring to FIG. 6, the user may provide the instruction to store the recorded content by pressing a stop button 612 on the remote 602. The recorded content can be stored in any suitable format, such as media signals that are playable to present the television content or modulated and encoded electrical signals that represent the television content. At block 412, the set-top box may concatenate different portions or clips into a single file based on one or more sets of start and end times, and may omit intervening media signals that were not to be recorded. The resulting file may then be stored in a recorded content storage for later playback or sharing. In one example, the content is stored in a forward-playback order, as opposed to the reverse-playback order in which the content was reviewed and recorded. Further, at block 412, for example, the set-top box may delete or overwrite the media signal that corresponds to the reverse-playback.

Figure 7:
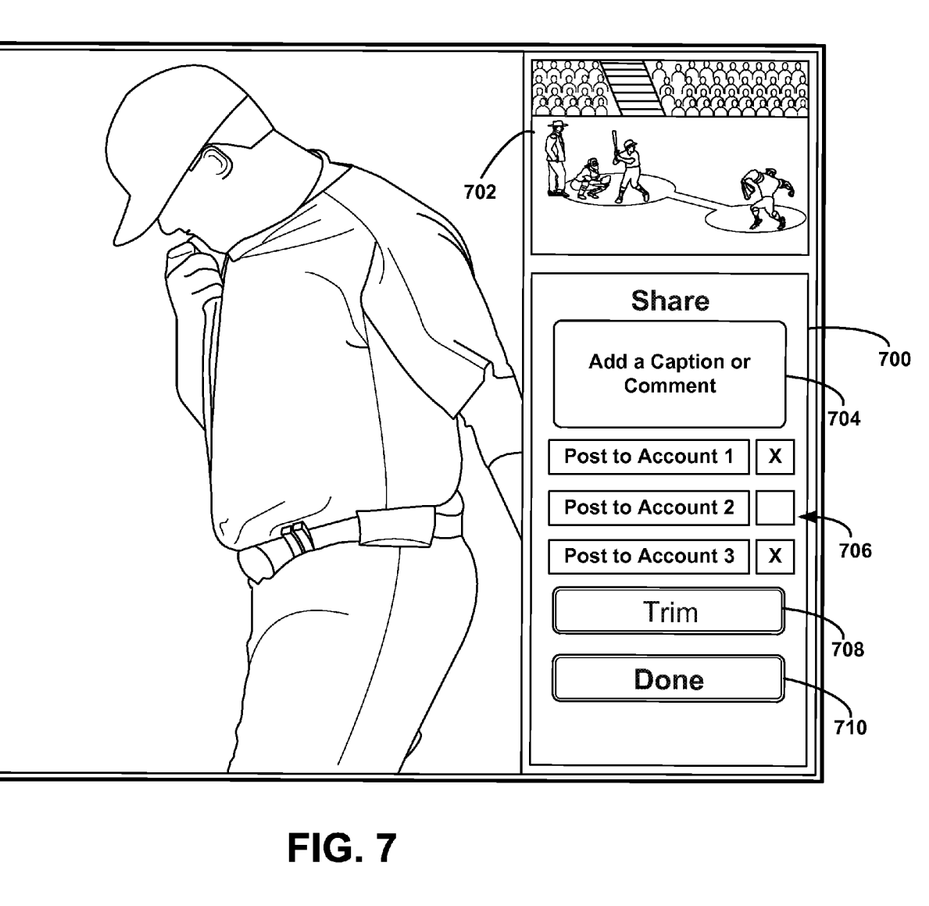

At block 414 of FIG. 4, the set-top box receives an instruction to share a stored recording. In example, the user can provide the instruction to share a stored recording by pressing a button 614 on the remote 602 to access stored recordings. The set-top box may then provide a user interface to allow the user to select a desired recording (not shown). Referring to the example of FIG. 7, responsive to the user selecting a desired recording, the set-top box displays another user interface 700 with sharing options. In FIG. 7, the user interface may appear in a picture-in-picture box over media signals that may continue to be played forward. The user interface 700 includes a screenshot 702 of the selected recording, a text box 704 to allow the user to enter a message to accompany the selected recording, a number of sharing options 706 for selection by the user, a trim option 708 to allow the user to edit the selected recording, and a done option 710 to communicate the selected recording (and any accompanying message) to the selected sharing option(s). In one example, when the user selects the done option 710, at block 416 of FIG. 4, an instruction is sent to the set-top box and the set-top box communicates the selected recording to the selected sharing option. For instance, at block 416, the set-top box communicates the selected recording to another computing device (e.g., a server) associated with the selected sharing option or social network application.

In one example, the set-top box may delete the recording automatically after the recording is shared or may prompt the user to provide an instruction to delete the recording. In this manner, the set-top box can reduce memory storage requirements of shared recordings.

Generally, the user can use the remote 600 or some other input device to navigate through the user interface 700. Further, additional or fewer sharing options may be provided for a particular user associated with the set-top box. For instance, the user may perform a configuration or setup procedure to select different sharing options and provide login information for social networking applications, as needed. In addition, the set-top box, for example, may learn user preferences over time, such as, a preference to share a video to a group of friends by email and also to share the video on a separate social networking application.

Figure 8:
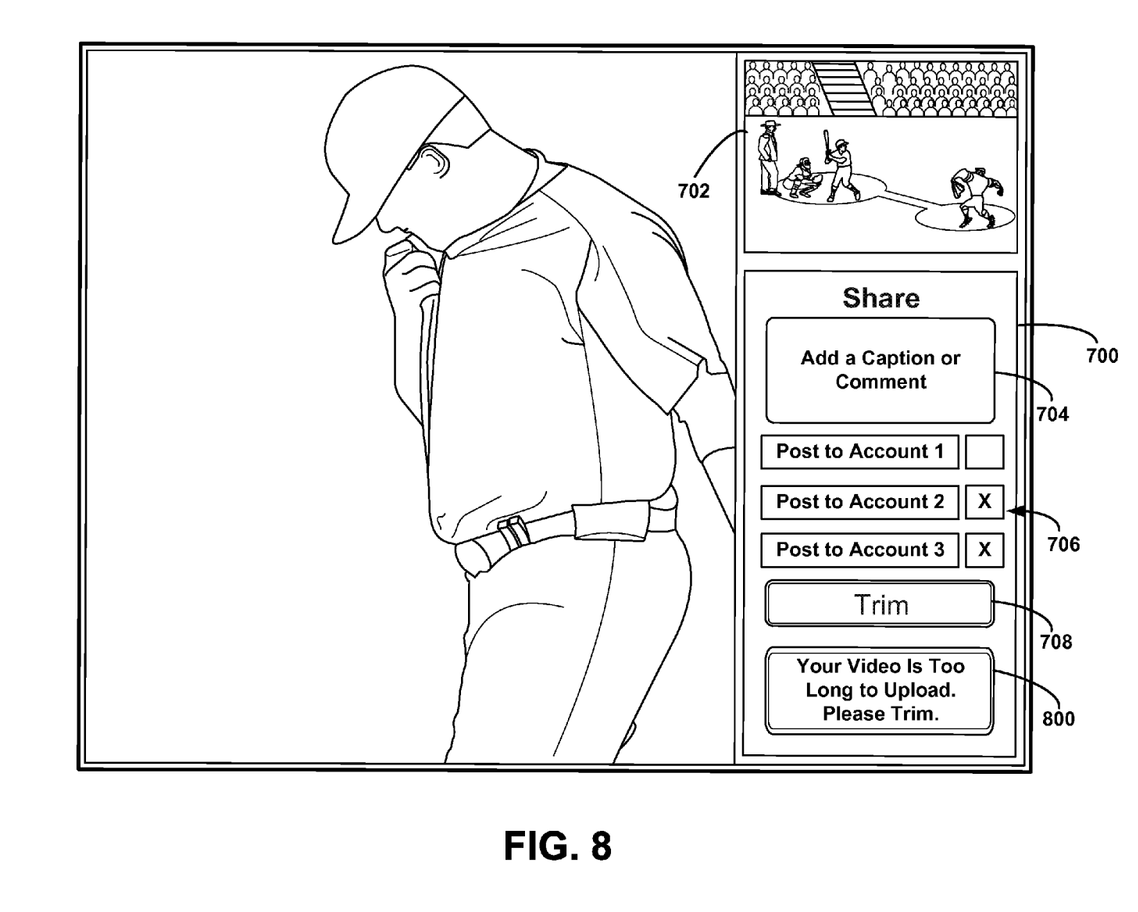

FIG. 8 illustrates another example, where the user has selected a sharing option that has particular requirements for content to be shared. In this example, the user has chosen Account 2 to share the selected recording, and Account 2 has a limit on the length of videos that can be uploaded. Accordingly, in this example, the set-top box provides a notification box 800 to notify the user that the selected recording is too long and needs to be trimmed before it can be shared.

Figure 9:
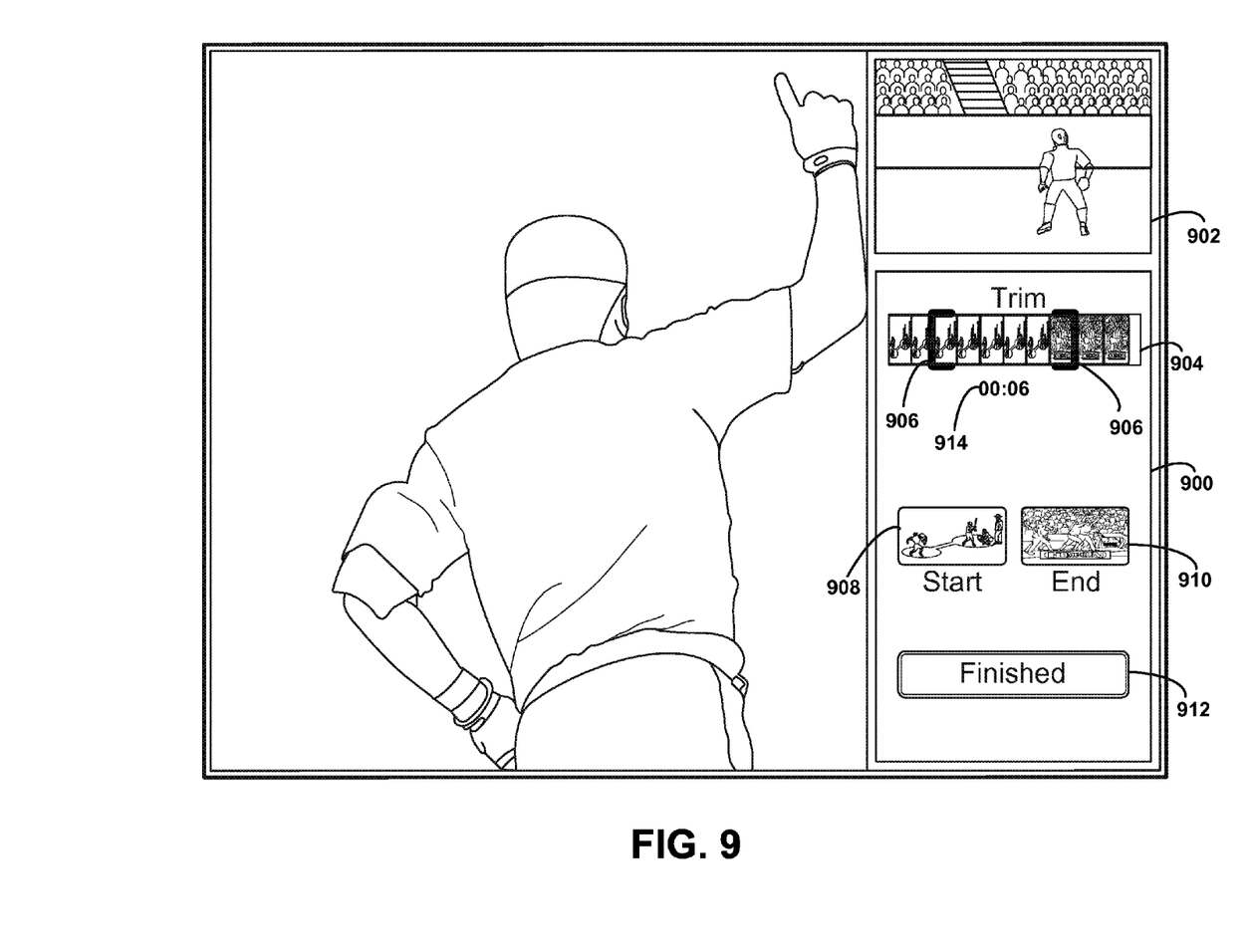

FIG. 9 illustrates an example where the user has selected the trim option for editing a selected recording. In response to receiving the selection of the trim option, the set-top box provides a trim or editing user interface 900. In this example, the trim user interface 900 may appear in a picture-in-picture box over media signals that may continue to be played forward. The user interface 900 in FIG. 9 displays selected frames of the recording in a box 902. The user interface 900 also includes a timeline 904 of the recorded frames, adjustable selection bars 906 for setting start and end points of a trimmed version of the recording, screenshots 908, 910 showing the start and end frame, respectively, and a finished option 912. In addition, the user interface 900 includes a timer 914 that displays a length of the recording defined by the selected start and end frames.

Generally, the user can use the remote 600 or some other input device to navigate through the user interface 900 and edit or trim the selected recording. For instance, the user can select either of the selection bars 906 and move the bars left and right to set a desired start frame or end frame. When the user is finished editing the recording, the user can select the finished option and return to the user interface 700 to proceed with sharing the recording.

IV. CONCLUSION

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

It should also be understood that for situations in which the embodiments discussed herein store and/or communicate content that is allegedly protected under copyright laws, that there is a corresponding expectation that such storage, communication, or other use of such content is covered by a copyright fair use exception and/or that permission has been acquired from the copyright holder.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

The invention claimed is:

1. A method, the method comprising:
receiving, by a processing system including a processor, an electronic signal broadcast from a television broadcasting system, wherein the electronic signal includes television content;
processing, by the processing system, the electronic signal to provide a first media signal that is playable to present a forward-playback of the television content;
receiving, at the processing system, a first instruction to begin recording the television content;
responsive to receiving the first instruction, the processing system providing a second media signal that is playable to present a reverse-playback of the television content, and recording a portion of the television content that corresponds to the reverse-playback;
receiving, at the processing system, a second instruction to stop recording the television content;
responsive to receiving the second instruction, the processing system stopping the recording of the television content;
receiving, at the processing system, a third instruction to save the recording of the television content;
responsive to receiving the third instruction, the processing system saving recorded portions of the television content;
responsive to receiving the second instruction, the processing system stopping the recording of the television content and continuing the reverse-playback of the television content as continued reverse-playback;
receiving, at the processing system, a fifth instruction to begin recording the television content; and
responsive to receiving the fifth instruction, the processing system recording a second portion of the television content that corresponds to the continued reverse-playback.

2. The method of claim 1, further comprising:
receiving, at the processing system, a sixth instruction to stop recording the television content; and
responsive to receiving the sixth instruction, the processing system stopping the recording of the television content; and wherein responsive to the third instruction, the processing system saving the recorded portions of the television content.

3. The method of claim 2, wherein responsive to the third instruction, the processing system concatenating the recorded portions of the television content as concatenated recorded portions and saving the concatenated recorded portions of the television content in a forward-playback order of corresponding television content.

4. The method of claim 1, further comprising providing, by the processing system, the first and second media signals so that the forward-playback and the reverse-playback of the television content are playable simultaneously on a display device.

5. The method of claim 1, further comprising receiving, at the processing system, a fourth instruction to communicate the saved recording of the television content to a separate processing system; and
responsive to receiving the fourth instruction, the processing system communicating the saved recording of the television content to the separate processing system.

6. The method of claim 5, further comprising receiving, at the processing system, a message to accompany the saved recording, and responsive to receiving the fourth instruction, the processing system communicating the saved recording and the message to the separate processing system.

7. The method of claim 1, further comprising storing the first media signal in a buffer storage of the processing system, and storing the saved recording of the television content in a recorded content storage of the processing system, wherein the recorded content storage is distinct from the buffer storage.

8. The method of claim 1, wherein the processing system comprises a set-top box.

9. The method of claim 1, wherein the processing system comprises a first processing system, wherein the electronic signal is simultaneously broadcast from the television broadcasting system to a plurality of user processing systems, and wherein the plurality of user processing systems includes the first processing system.

10. A method, the method comprising:
receiving, by a processing system including a processor, an electronic signal broadcast from a television broadcasting system, wherein the electronic signal represents television content;
processing, by the processing system, the electronic signal to provide a first media signal that is playable to present a forward-playback of the television content;
storing the first media signal in a buffer storage of the processing system;
receiving, at the processing system, a first instruction to begin recording the television content;
responsive to receiving the first instruction, the processing system providing a second media signal that is playable to present a reverse-playback of the television content, and setting an end point for a recording of a portion of the television content that corresponds to the reverse playback;
receiving, at the processing system, a second instruction to stop recording the television content;
responsive to receiving the second instruction, the processing system setting a start point for recording the portion of the television content that corresponds to the reverse-playback;
receiving, at the processing system, a third instruction to store the recording of the television content;
responsive to receiving the third instruction, the processing system storing the recording of the portion of the television content in a recorded content storage of the processing system, wherein the stored recording is defined at least in part by the start and end points, and wherein the stored recording is in a forward-playback order of corresponding television content;
responsive to receiving the second instruction, the processing system setting the start point and continuing the reverse-playback of the television content;
receiving, at the processing system, a fifth instruction to begin recording the television content; and
responsive to receiving the fifth instruction, the processing system setting a second end point for a recording of a second portion of the television content that corresponds to continued reverse-playback.

11. The method of claim 10, further comprising providing, by the processing system, the first and second media signals so that the forward-playback and the reverse-playback of the television content are playable simultaneously on a display device.

12. The method of claim 10, further comprising receiving, at the processing system, a fourth instruction to communicate the stored recording to a social networking application; and
responsive to receiving the fourth instruction, the processing system communicating the stored recording to a separate processing system associated with the social networking application.

13. The method of claim 12, further comprising:
responsive to receiving the fourth instruction, the processing system providing a notification that the stored recording should be edited to comply with requirements of the social networking application; and
responsive to the notification, providing a graphical user interface for editing the stored recording.

14. The method of claim 10, further comprising:
receiving, at the processing system, a sixth instruction to stop recording the television content; and
responsive to receiving the sixth instruction, the processing system setting a second start point for recording the second portion of the television content; and
wherein responsive to the third instruction, the processing system storing the recording of the portions of the television content.

15. The method of claim 14, wherein the processing system comprises a set-top box, and the electronic signal is simultaneously broadcast from the television broadcasting system to a plurality of user processing systems, and wherein the plurality of user processing systems includes the set-top box.

16. A computing device comprising:
a processing system including a processor; and
a memory that stores executable instructions that, when executed by the processing system, facilitate performance of operations, comprising:
receiving an electronic signal broadcast from a television broadcasting system,
wherein the electronic signal represents television content;
processing the electronic signal to provide a first media signal that is playable to present a forward-playback of the television content;
receiving a first instruction to begin recording the television content;
responsive to receiving the first instruction, providing a second media signal that is playable to present a reverse-playback of the television content, and recording a portion of the television content that corresponds to the reverse-playback;
receiving a second instruction to stop recording the television content;
responsive to receiving the second instruction, stopping the recording of the television content;
receiving a third instruction to save the recording of the television content;
responsive to receiving the third instruction, storing a recording of portions of the television content;
responsive to receiving the second instruction, stopping the recording of the television content and continuing the reverse-playback of the television content;
receiving a fifth instruction to begin recording the television content;
responsive to receiving the fifth instruction, recording a second portion of the television content that corresponds to continued reverse-playback; and
providing an interface to edit the recording of the television content.

17. The computing device of claim 16, wherein the operations further comprise:
receiving a sixth instruction to stop recording the television content;
responsive to receiving the sixth instruction, stopping the recording of the television content; and
responsive to the third instruction, saving the recorded portions of the television content.

18. The computing device of claim 16, wherein the operations further comprise, responsive to the third instruction, concatenating the recorded portions of the television content as concatenated recorded portions and saving the concatenated recorded portions of the television content in a forward-playback order of corresponding television content.

19. The computing device of claim 16, wherein the memory includes a buffer storage and a recorded content storage, wherein the buffer storage is distinct from the recorded content storage, and wherein the operations further comprise storing the first media signal in the buffer storage and storing the recording of the television content in the recorded content storage.

20. The computing device of claim 16, wherein the operations further comprise receiving the electronic signal simultaneously broadcast from the television broadcasting system to a plurality of user computing devices, and wherein the plurality of user computing devices comprise set-top boxes.

* * * * *